United States Patent
Tanaka

[19]

[11] Patent Number: 6,130,987
[45] Date of Patent: Oct. 10, 2000

[54] AUDIO-VIDEO SYNCHRONOUS PLAYBACK APPARATUS

[75] Inventor: Mitsumasa Tanaka, Tokyo, Japan

[73] Assignee: NEC Corporation, Japan

[21] Appl. No.: 09/165,219

[22] Filed: Oct. 1, 1998

[30]   Foreign Application Priority Data

Oct. 2, 1997   [JP]   Japan ................................. 9-269423

[51] Int. Cl.[7] .................................................. H04N 5/928
[52] U.S. Cl. .............................. 386/96; 386/98; 348/423; 348/515; 348/845.3; 375/240.28
[58] Field of Search .............................. 386/96, 98, 101, 386/39, 104, 13; 348/512, 515, 518, 845.3, 423.1; 375/240.26, 240.28; H04N 5/928

[56]   References Cited

U.S. PATENT DOCUMENTS

| | | | |
|---|---|---|---|
| 5,430,485 | 7/1995 | Lankford et al. | 348/423.1 |
| 5,508,816 | 4/1996 | Ueda et al. . | |
| 5,559,999 | 9/1996 | Maturi et al. . | |
| 5,583,652 | 12/1996 | Ware | 386/104 |
| 5,596,420 | 1/1997 | Daum | 386/101 |
| 5,603,016 | 2/1997 | Davies | 348/515 |
| 5,617,502 | 4/1997 | Ort et al. | 386/97 |
| 5,642,171 | 6/1997 | Baumgartner et al. . | |
| 5,726,989 | 3/1998 | Dokie | 348/423.1 |
| 5,815,634 | 9/1998 | Daum et al. | 386/96 |

FOREIGN PATENT DOCUMENTS

| | | |
|---|---|---|
| 648056 | of 1994 | European Pat. Off. . |
| 681398 | of 1995 | European Pat. Off. . |
| 840528 | of 1997 | European Pat. Off. . |
| 3004096 | 8/1994 | Japan . |
| 7095522 | of 1995 | Japan . |
| 7-75059 | 3/1995 | Japan . |
| 7-110756 | 4/1995 | Japan . |
| 8251543 | of 1996 | Japan . |
| 9619076 | of 1996 | WIPO . |

OTHER PUBLICATIONS

Japanese Office Action issued Feb. 9, 2000 in a related application and English translation of relevant portions.

*Primary Examiner*—Wendy Garber
*Assistant Examiner*—Vincent F. Boccio
*Attorney, Agent, or Firm*—Ostrolenk, Faber, Gerb & Soffen, LLP

[57] ABSTRACT

The audio-video synchronous playback apparatus of the present invention for expanding digital compressed audio data and digital compressed video data, respectively, and for synchronously playing back expanded audio data and expanded video data, comprises: an element for obtaining an audio playback time based on the amount of the played-back audio data; a means for determining progress in expanding the video data based on the audio playback time; and a recovery element for saving the processing time for the audio data and assigning a saved time to a process for the video data so as to recover any delay in a video portion when the expansion process for the video data is delayed with respect to the expansion process for the audio data.

18 Claims, 6 Drawing Sheets

AUDIO-VIDEO SYNCHRONOUS PLAYBACK APPARATUS

FIELD OF THE INVENTION

The present invention relates to an audio-video synchronous playback apparatus for expanding digital compressed audio data and digital compressed video data, respectively, and for synchronously playing back the expanded audio data and the expanded video data.

This application is based on Japanese Patent Application No. Hei 9-269423, the contents of which are incorporated herein by reference.

BACKGROUND ART

A conventional audio-video synchronous playback apparatus reads digital compressed audio data and digital compressed video data from a CD-ROM or a hard disc unit, expands them, and plays back the expanded audio data through a speakers and the expanded video data through a display device such as a CRT monitor.

Conventional audio-video synchronous playback apparatuses for expanding digital compressed audio data and digital compressed video data, respectively, and for synchronously playing back the expanded audio data and the expanded video data (hereinafter, this apparatus will be referred to as the "playback apparatus") are divided broadly into two categories: the first category includes a playback apparatus which has an enough data throughput capacity or which handles a small-sized compressed codes of video data, and the second category includes a playback apparatus which has an insufficient data throughput capacity or which handles a large-sized compressed codes of video data. With the playback apparatus in the first category, all audio data and video frames are played back without interruption because the expansion processes for the audio data and for the video data are performed rapidly. Meanwhile, with the playback apparatus in the second category, the video portion may be played back in slow motion and the audio is intermittently played back, not in a real time manner, because the expansion processes is performed slowly.

The audio which has been intermittently played back may often cause incompatibility to human senses, and the process for the audio data is therefore prior to the process for the video data so that the audio is continuously played back. The conventional apparatus assigns the portion of the throughput capacity, which has not been assigned to the expansion and playback processes for the audio data, to the expansion and playback processes for the video data. When synchronization (coinciding of playback current positions) between the audio data and the video data is not established, a time lag may occur between the audio portion and the video portion, and an appropriate thinning process for the video frames (dropping of the video frames) has been therefore necessary.

One known standard for digital compression is MPEG (Moving Picture Experts Group), where multiplexed, compressed, and coded audio-video data are synchronously played back. In a compression process, time information for executing playback and display are attached to the audio data and the video data. In the expansion process, the playback is performed synchronizing the audio data with the video data with reference to the time information.

As is conventionally known, various types of synchronous playback methods for the audio data and the video data have been proposed. For example, one conventional method is disclosed in "An Image and Audio Decoder" in Japanese Patent Application, First Publication No. Hei 7-75059 (hereinafter, it is referred to as "Citation 1"). When audio playback precedes video playback on a time basis, the image and audio decoder interpolates the audio data in every block calculated based on a time delay, thus synchronizing the audio data with the video data. Further, when the video playback precedes the audio playback on a time basis, the image audio decoder continues displaying of the video portion for the delay time, thus synchronizing the audio data with the video data.

Another method is disclosed in "An Animation Sound Synchronous Control Apparatus" in Japanese Patent Application, First Publication No. Hei 7-110756 (hereinafter, it is referred to as "Citation 2"). The animation sound synchronous control apparatus sets the next images to be displayed based on a playback start time, a display process completion time, and the number of frames to be displayed per unit time (frame rate), so that video playback in accordance with the frame rate can be provided. The animation sound synchronous control apparatus plays back data accompanied by the video portion in audio playback, thereby synchronizing audio data with the video data.

However, the problem arises that, for example, when data having audio data which include background music and video data include important data, there is a possibility that necessary frames may be dropped through synchronization of the audio data with the video data by continuously dropping the video frames in the conventional method.

According to the Citation 1, because the display or the playback is performed in accordance with whichever is delayed, the playback may not be performed in a real-time manner, because the video portion may be played back in slow motion.

While in the Citation 2 the frame rate is adjusted by skipping some video data during playback, some audio data are also skipped when the video data are skipped over because the audio data accompanies the video data. The audio portion may be intermittently played back under an environment where a CPU has low capacity.

SUMMARY OF THE INVENTION

It is therefore an object of the present invention to provide an audio-video synchronous playback apparatus which synchronizes audio data with video data even when the video playback is delayed with respect to the audio playback.

In order to accomplish the above object, an audio-video synchronous playback apparatus according to the present invention for expanding digital compressed audio data and digital compressed video data, respectively, and for synchronously playing back expanded audio data and expanded video data, comprises: a means for obtaining an audio playback time based on the amount of the played-back audio data; a means for determining progress in expanding the video data based on the audio playback time; and a recovery means for saving the processing time for the audio data and assigning a saved time to a process for the video data so as to recover any delay in a video portion when the expansion process for the video data is delayed with respect to the expansion process for the audio data.

In another aspect of the invention, the recovery means may comprise a means for degrading the tone quality of an audio portion to save the processing time for the audio data. The recovery means may comprise a means for skipping audio data to save the processing time for the audio data. The recovery means may comprise a means for monitoring and limiting the number of the skips in a predetermined time when audio data are skipped. The recovery means may comprise: a tone degrading means (first means) for degrading the tone quality of an audio portion so as to save the processing time for the audio data; a audio skipping means (second means) for skipping some audio data so as to save the processing time for the audio data; and a frame dropping means (third means) for dropping a video frame to recover any delay in the video portion when the delay is not recovered by the tone degrading means and said audio skipping means.

According the construction, even when a clock in the playback apparatus is not precise, the progress of the video portion can be determined by calculating a reference time for synchronization of the audio data with the video data based on the audio playback data amount, calculating the ideal frame count based on the reference time, and comparing the ideal frame count with the actual frame count. When the video portion is delayed with respect to the audio portion, the process for the audio data is saved and more time is assigned to the process for the video data, so that the delay in the video portion with respect to the audio portion can be recovered and synchronization of the audio data with the video data can be achieved.

In playback of data in which the audio portion includes background music and the video portion includes important data, the processes for the audio data are omitted to recover the delay, thereby decreasing the possibility of dropping necessary frames through the synchronization of the audio data with the video data.

DETAILED DESCRIPTION OF THE PREFERRED EMBODIMENTS

Figure 2:
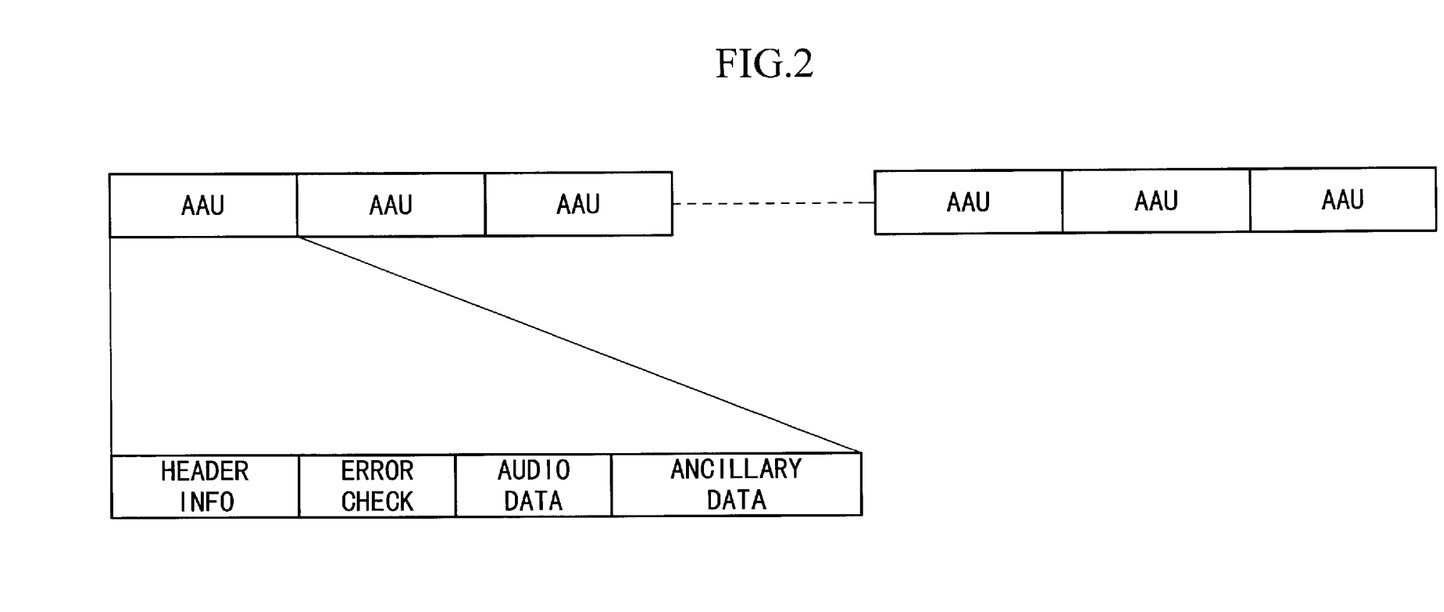
FIG. 2 is a diagram showing a construction in MPEG audio data.

Data construction handled in the present invention will be explained by way of MPEG audio data as an example. As shown in FIG. 2, MPEG audio data comprise AAUs (Audio Access Units), which are the minimum units expandable into audio signals independently. An AAU comprises 32 bits of header information, 16 bits of error checks (options), audio data, and ancillary data. The top 12 bits in the header information, which are called a synchronous word, are set to "1", and used for detection of the AAU. The header information further includes data formats such as the number of channels and a sampling frequency.

Figure 1:
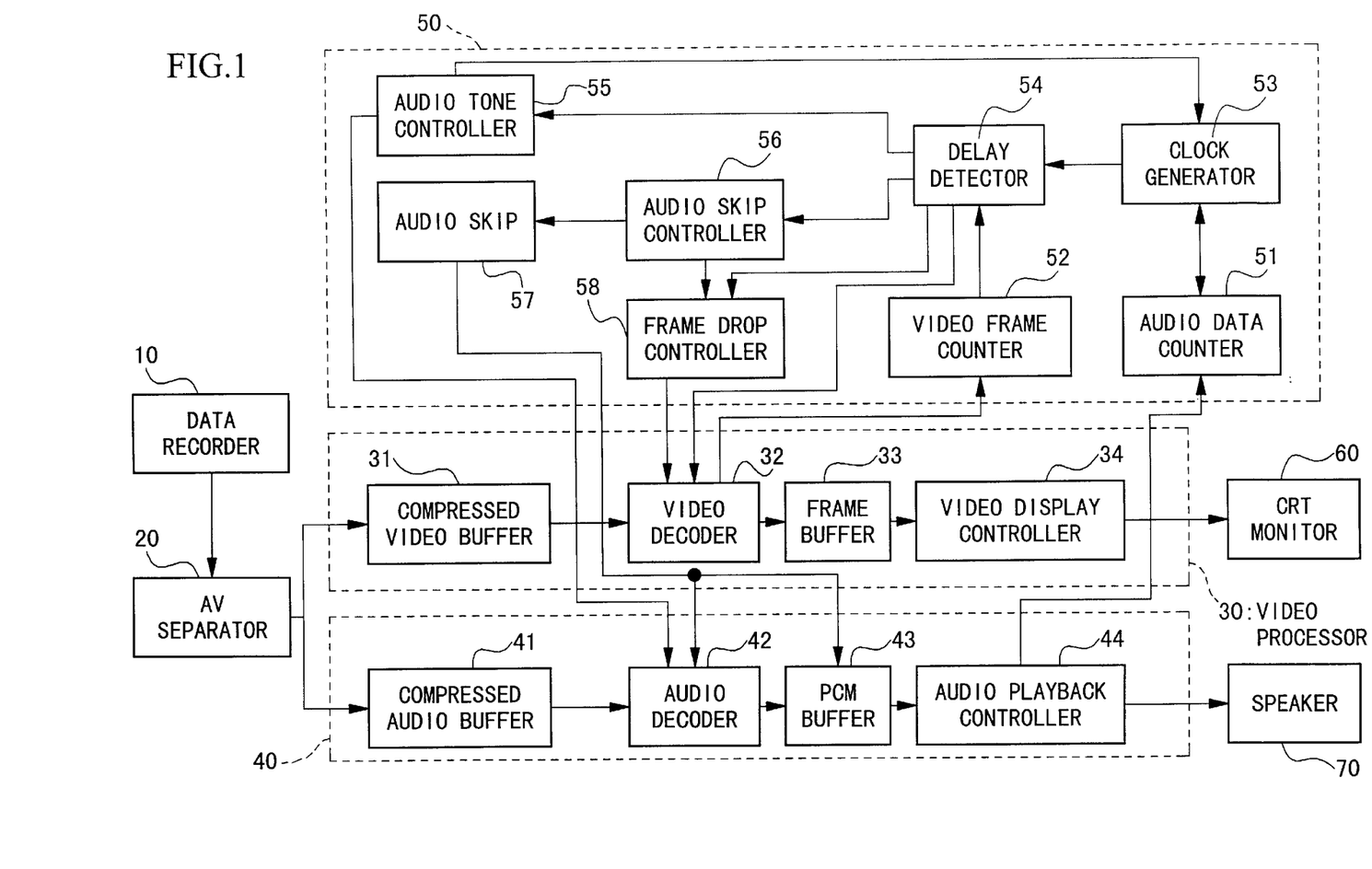
FIG. 1 is a block diagram showing a construction of an audio-video synchronous playback apparatus according to an embodiment of the present invention.

Referring to FIG. 1, the audio-video synchronous playback apparatus, according to an embodiment of the present invention, will be explained.

The audio-video synchronous playback apparatus for synchronously playing back audio and video signals read from a data recorder 10, comprises an audio-video (AV) separator 20, a video processor 30, an audio processor 40, an AV synchronization controller 50, a CRT monitor 60, and a speaker 70.

The data recorder 10 stores the digital compressed coded audio-video data, in which digital compressed coded audio data and digital compressed coded video data are multiplexed and recorded as compressed audio-video data. The AV separator 20 reads the compressed audio-video data from the data recorder 10, and separates audio data and video data from the multiplexed compressed audio-video data. The video processor 30 expands the video data separated by the AV separator 20. The audio processor 40 expands the audio data separated by the AV separator 20. The AV synchronization controller 50 performs synchronization control for the audio data and the video data. The CRT monitor 60 displays the video data expanded by the video processor 30, while the speaker 70 plays back the audio data expanded by the audio processor 40.

The video processor 30 comprises a compressed video buffer 31, a video decoder 32, a frame buffer 33, and video display controller 34. The compressed video buffer 31 stores the video data, which are separated by the AV separator 20, as compressed video data. The video decoder 32 analyzes attribute information (video header information) in the compressed video data stored in the compressed video buffer 31, expands the compressed video data, and outputs expanded video data. The frame buffer 33 stores the video data expanded by the video decoder 32. The video display controller 34 sends the expanded video data from the frame buffer 33 to the CRT monitor 60.

The audio processor 40 comprises a compressed audio buffer 41, an audio decoder 42, a PCM buffer 43, and an audio playback controller 44. The compressed audio buffer 41 stores the audio data, which are separated by the AV separator 20, as compressed audio data. The audio decoder 42 analyzes attribute information (audio header information) in the compressed audio data stored in the compressed audio buffer 41, expands the compressed audio data, and outputs expanded audio data. The PCM buffer 43 stores the audio data expanded by the audio decoder 42. The audio playback controller 44 sends the expanded audio data in the PCM buffer 43 to the speaker 70.

The AV synchronization controller 50 comprises an audio data counter 51, a video frame counter 52, a clock generator 53, a delay detector 54, an audio tone controller 55, an audio skip controller 56, an audio skip block 57, and a frame drop controller 58.

The audio data counter 51 stores an accumulated amount of audio data which have been played back and expanded from the beginning of the playback up to the present. The clock generator 53 calculates an audio playback elapsed time (reference time) based on the accumulated data amount stored in the audio data counter 51 and on the audio header information obtained in the expansion by the audio decoder 42. That is, the audio data counter 51 and the clock generator 53 work as a means for obtaining the playback time of the audio portion based on the playback audio data amount.

The video frame counter 52 stores the accumulated frame count (actual frame count) of the video data which have been expanded and displayed from the beginning of the playback up to the present. The delay detector 54 calculates a video frame count to be naturally expanded and displayed (ideal frame count) based on the reference time obtained by the clock generator 53 and the video header information obtained by the video decoder 32, and compares the ideal frame count with the actual frame count from the video frame counter 52 to determine progress of video. That is, the video frame counter 52 and the delay detector 54 work as a means for determining the progress of the expansion process for the video data based on the audio playback time.

The audio tone controller 55 performs one of the following operations when the video playback is delayed with respect to the audio playback, and when the video playback precedes the audio playback or is synchronized with the audio playback. In the former case, the audio tone controller 55 directs the audio decoder 42 to lower a tone quality by reducing the number of audio channels when the audio data include a plurality of channels, or by reducing a sampling frequency when the sampling frequency is a high frequency. That is, the audio tone controller 55 works with the audio decoder 42 as a means for saving a processing time for the audio data by degrading the audio quality (tone quality) when the expansion process for the video data is delayed with respect to the expansion process for the audio data, and to recover the delay of the video portion by assigning the saved time to the process for the video data. In the latter case, the audio tone controller 55 directs the audio decoder 42 to perform the expansion process according to the audio header information when the tone quality is degraded.

The audio skip block 57 skips the expansion process for the audio data for one AAU in response to a skip command, which will be described below, and stores the audio data in which the last AAU is expanded, the data being stored in the PCM buffer 43, into the PCM buffer 43. That is, when the expansion process for the video data is delayed with respect to the expansion process for the audio data, the audio skip block 57 works with the audio decoder 42 and the PCM buffer 43 as a means for recovering the delay in the video portion by skipping some audio data to save the processing time for the audio data and by assigning the saved time to the process for the video data.

In response to a skip determination command from the delay detector 54, the audio skip controller 56 sends the skip command to the audio skip block 57, counts the number of the executed skips for the audio data in the audio skip block 57, and limits the number of skips executable in a specified time. In other words, the audio skip controller 56 works as a means for monitoring and limiting the number of skips executable in a specified time.

In response to a frame drop command from the audio skip controller 56, the frame drop controller 58 controls dropping of frames of the video data. That is, the frame drop controller 58 works with the video decoder 32 as a means for recovering the delay in the video portion by dropping video frames when the expansion process for the video data is delayed with respect to the expansion process for the audio data, and when the delay in the video portion is not recovered by the skip for the audio data.

Figure 3:
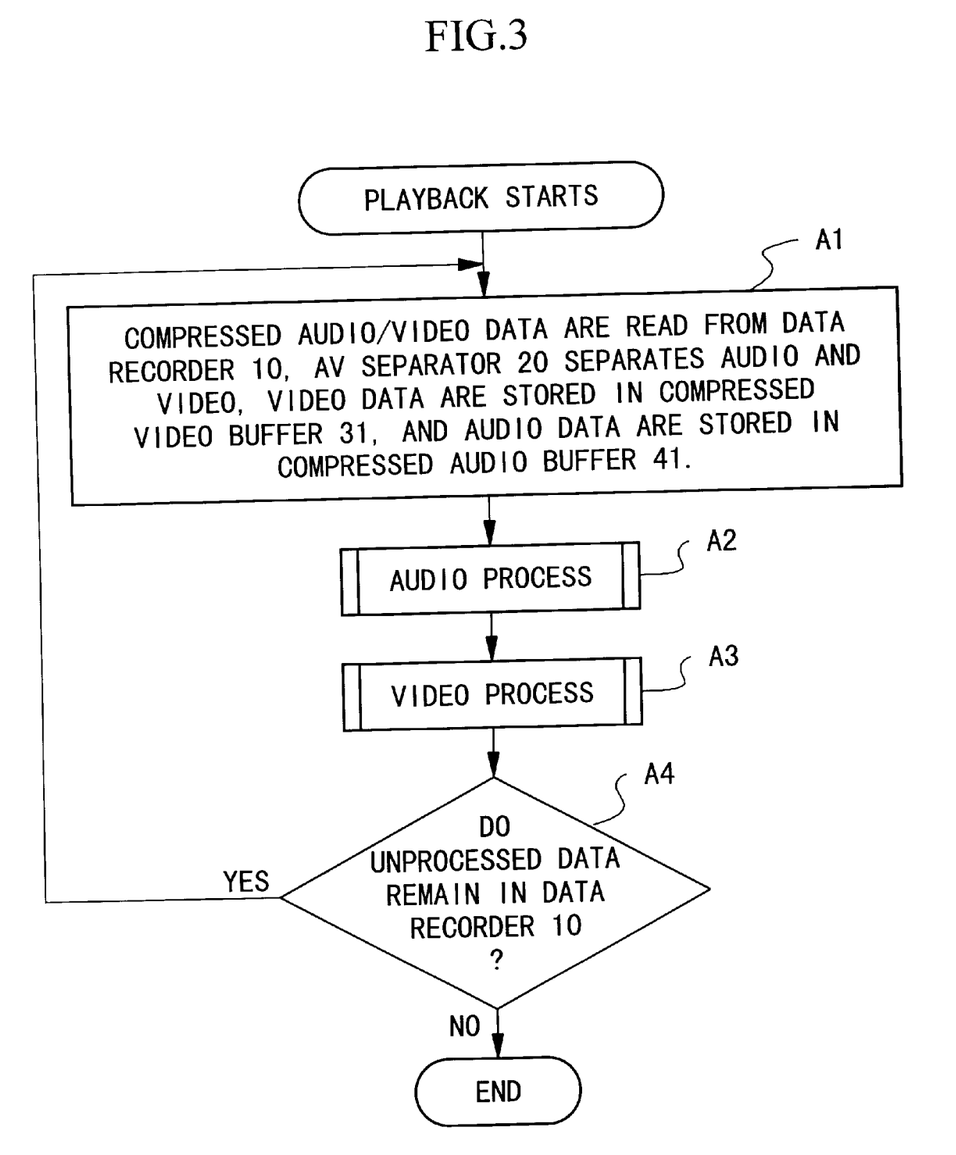
FIG. 3 is a flow chart showing a playback process in the audio-video synchronous playback apparatus of FIG. 1.

Referring to FIG. 3, a playback operation with the audio-video synchronous playback apparatus of FIG. 1 will be explained.

In step A1, multiplexed compressed audio-video data are read from the data recorder 10, the AV separator 20 separates audio data and video data, the video data are stored in the compressed video buffer 31, and the audio data are stored in the compressed audio buffer 41. In step A2, the AV synchronization controller 50 and the audio processor 40 perform the synchronization control process, the expansion process for the audio data, and the playback process. In step A3, the AV synchronization controller 50 and the video processor 30 perform the synchronization control process and the expansion/display process for the video data. In step A4, it is determined whether unprocessed compressed audio-video data remain in the data recorder 10, and the flow returns to step A1 when data remains. When no data remain, the playback process for the compressed audio-video data is stopped.

Figure 4A:
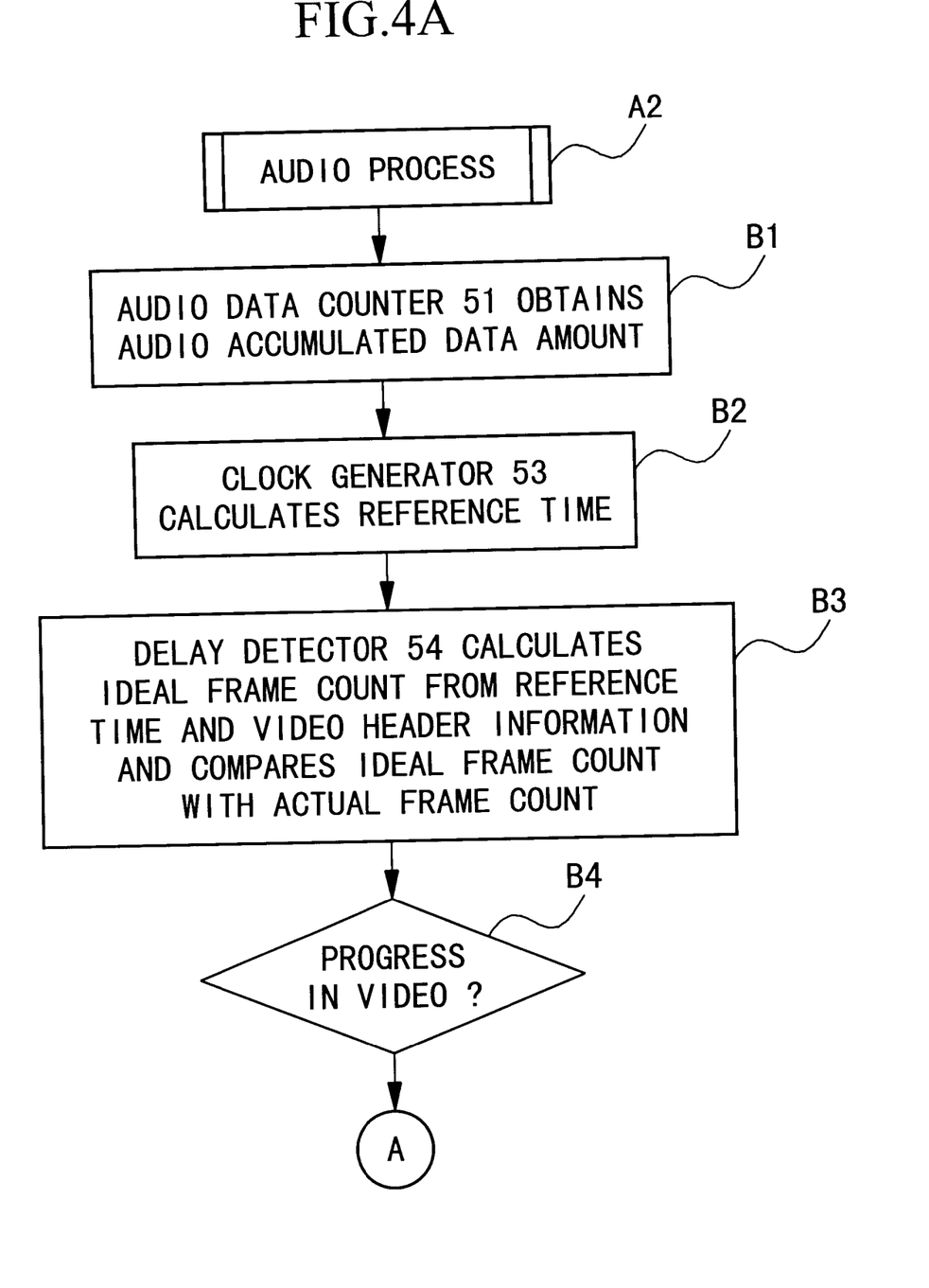
FIGS. 4A and 4B are flow charts showing the audio process in FIG. 3 in more detail.
Figure 4B:
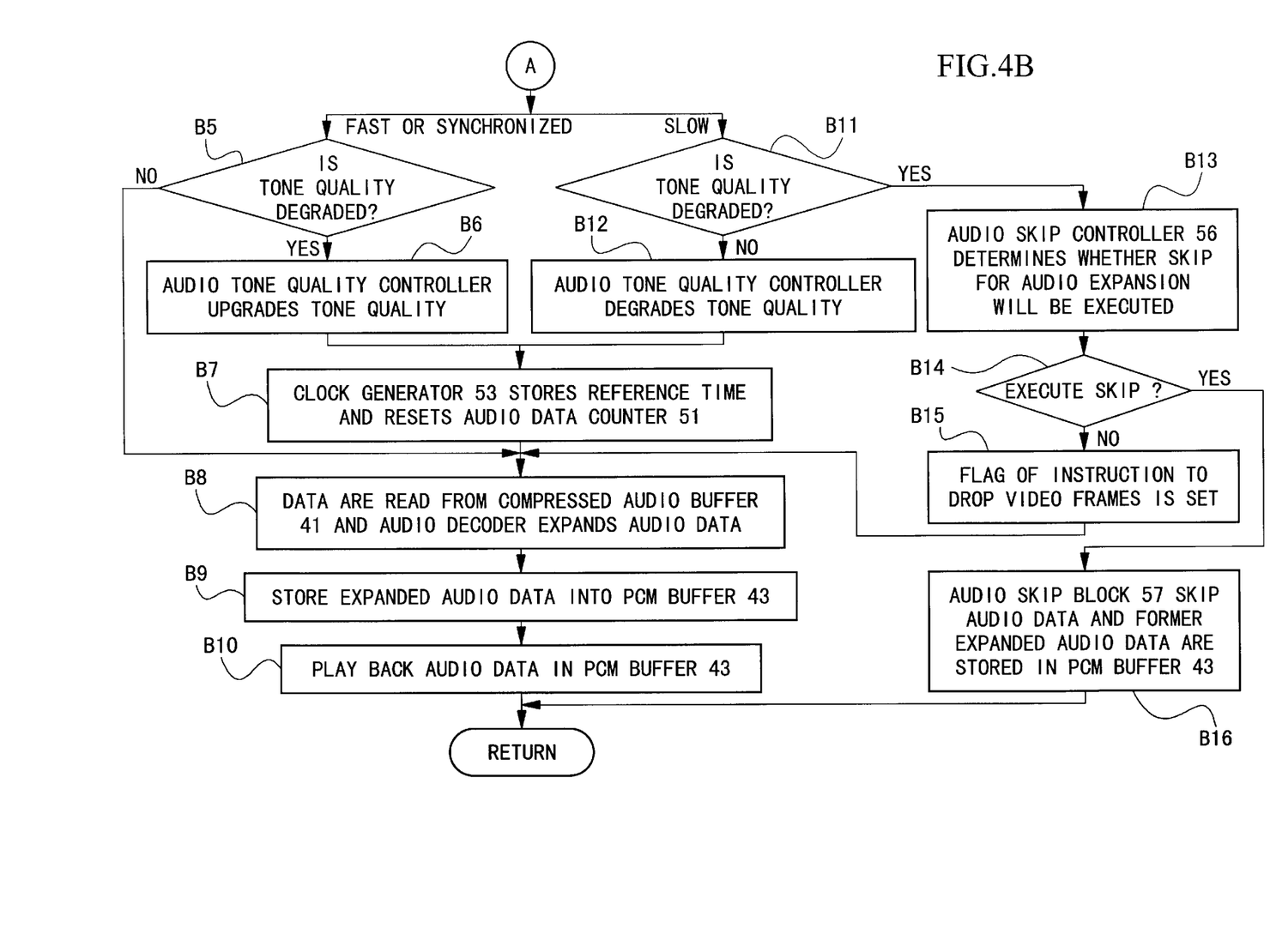

Referring to FIGS. 4A and 4B, the process in step A2 shown in FIG. 3 will be explained in detail. In step B1, the audio data counter 51 obtains the accumulated amount of the audio data which have been played back. The flow proceeds from step B1 to step B2, where the clock generator 53 calculates the playback elapsed time (reference time) from the beginning of the audio playback up to the present based on the audio header information obtained in step B8, which is described below, and on the accumulated amount of the audio playback data obtained in step B1. The flow proceeds from step B2 to B3.

In step B3, the delay detector 54 calculates the video frame count to be naturally expanded and displayed (ideal frame count), based on the reference time obtained in step B2 and on the video header information obtained in step C5, which is described below. The delay detector 54 obtains the frame count actually expanded and displayed (actual frame count), and compares the ideal frame count with the actual frame count. The flow proceeds from step B3 to step B4, where it determines the progress of the video playback with respect to the audio playback according to the result of comparison of the ideal frame count and the actual frame count. When the video playback precedes the audio playback on a time basis or when they are synchronized, the flow proceeds to step B5. When the audio playback is delayed from the video playback, the flow proceeds to step B11.

In step B5, it is determined whether the tone quality has been degraded. When the tone quality has been degraded, the flow proceeds to step B6. When the tone quality has not degraded, the flow proceeds to step B8.

In step B6, the audio tone controller 55 upgrades the tone quality. The "upgrade of the tone quality" means directing the audio decoder 42 to perform the expansion process with the number of output channels or with a sampling frequency according to the audio header information. The flow proceeds from step B6 to step B7.

In step B7, the clock generator 53 stores the present reference time as a former reference time and resets the audio data counter 51, because the result of calculation for the reference time is changed according to the change of the tone quality by the audio tone controller 55. The next reference time is obtained by adding the former reference time as an offset value to a newly calculated reference time. The flow proceeds from step B7 to step B8.

In step B8, the compressed audio data are read from the compressed audio buffer 41, and are expanded by the audio decoder 42. Further, the audio decoder 42 carries out analysis of the audio header information. The flow proceeds from step B8 to step B9, where the audio data expanded by the audio decoder 42 are stored into the PCM buffer 43. The flow proceeds from step B9 to B10, where the audio playback controller 44 controls the playback for the expanded audio data stored in the PCM buffer 43.

In step B11, it is determined whether the tone quality has been degraded. When the tone quality has not been degraded, the flow proceeds to step B12, and when the tone quality has been degraded, the flow proceeds to step B13.

In step B12, the audio tone controller degrades the tone quality. The "degrading of the tone quality" means directing the audio decoder 42 to output the audio portion through a single channel when a plurality of the output channels depending on the audio header information. It may be possible to direct the audio decoder 42 to reduce a sampling frequency by thinning out the audio data on a time basis when the sampling frequency is a high frequency. The flow proceeds from step B12 to step B7.

In step B13, the audio skip controller 56 obtains the number of skips for the audio which are carried out in a predetermined time. The flow proceeds from step B13 to step B14, where the audio skip controller 56 compares the number of the executed skipped processes for the audio data with a preset maximum value of the number of skipped processes executable in a predetermined time. When the number of the skipped processes is greater than the maximum value, the flow proceeds to step B15. When the number of the skipped processes is less than the maximum value, the flow proceeds to step B8.

In step 15, a flag of an instruction to drop the video frames is set, because the audio portion becomes extremely deteriorated when the process for the audio data is further omitted. The flow proceeds from step B15 to step B8.

In step B16, the audio skip block 57 skips the expansion process for the audio data by one AAU, and the audio data in which the former AAU is expanded, the data being stored in the PCM buffer 43, are stored in the PCM buffer 43. The flow proceeds from step B16 to step B10.

Figure 5:
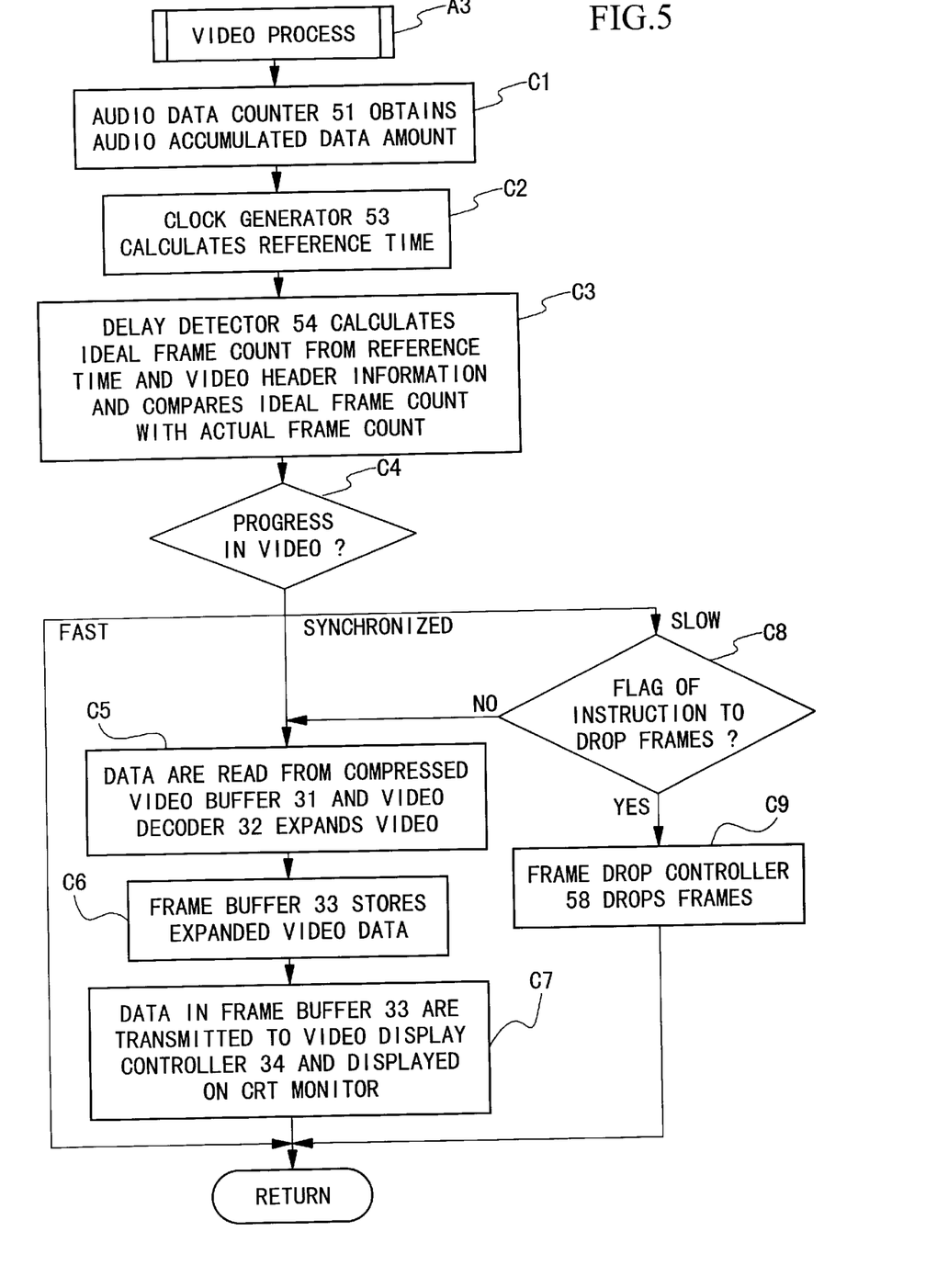
FIG. 5 is a flow chart showing the audio process in FIG. 3 in more detail.

Referring to FIG. 5, the process in step A3 of FIG. 3 will be explained in detail. In step C1, the audio counter 51 obtains the accumulated amount of the audio data which have been played back. The flow proceeds from step C1 to step C2, where the clock generator 53 calculates an audio playback elapsed time (reference time) from the beginning of the playback up to the present, based on the audio header information obtained in step B8 described above and on the accumulated data amount of the played-back audio portion. The flow proceeds from step C2 to step C3.

In step C3, the delay detector 54 calculates a video frame count to be naturally expanded and displayed (ideal frame count), based on the reference time obtained in step C2 and on the video header information obtained in step C5, which will be described below. Further, the delay detector 54 obtains the frame count actually expanded and displayed (actual frame count), and compares the ideal frame count with the actual frame count. The flow proceeds from step C3 to step C4.

In step C4, the progress of the video playback with respect to the audio playback is determined according to the result of comparison of the ideal frame count and the actual frame count in step C3. When the video playback precedes the audio playback on a time basis, the video processing is stopped. When the video playback is synchronized with the audio playback, the flow proceeds to step C5. When the video playback is delayed with respect to the audio playback, the flow proceeds to step C8.

In step C5, the compressed video data are read from the compressed video buffer 31, and the video decoder 32 expands the compressed video data. Further, the video decoder 32 analyzes the video header information. The flow proceeds from step C5 to step C6, where the video data expanded by the video decoder 32 are stored in the frame buffer 33. The flow proceeds from step C6 to step C7, where the video display controller 34 executes a display process for the expanded video data in the frame buffer 33.

In step C8, it is determined whether the flag of the instruction to drop the video frame is set in step B15. When the flag is set, the flow proceeds to step C9. When the flag is not set, the flow proceeds to step C5.

In step C9, the frame drop controller 58 executes the frame drop process, which means directing the video decoder 32 to skip the object video frame.

A method for determining synchronization when the MPEG data are played back with the audio-video synchronization playback apparatus according to the present invention will be explained.

On the assumption that a layer in the audio header information of the compressed data is "layer 1", a bit rate is 192,000 bit/second, a sampling frequency is 44,100 Hz, and there are two channels for stereo sound, a format of the PCM data produced by expanding the data includes two channel, a sampling frequency of 44,100 Hz, and 16 bits/sample. The clock generator 53 calculates the reference time based on the accumulated data amount obtained by the audio data counter 51 according to the formula (1):

$$\text{reference time} = \text{accumulated data amount}/(\text{sampling frequency} \times \text{bit}/8[\text{bits}] \times \text{number of channel}) = \text{accumulated data amount}/(44100 \times 16/8 \times 2).$$

Because the result of calculation for the reference time is affected by the change of the tone quality, the present reference time is stored as the former reference time, and the accumulated data amount is reset. The clock generator 53 calculates the new reference time after the change of the tone quality according to the formula (2):

$$\text{reference time} = \text{accumulated data amount}/(\text{sampling frequency} \times \text{bit}/8[\text{bits}] \times \text{number of channel}) + \text{former reference time}.$$

When the bit rate in the video header information is 1,400,000 bits/second and the frame rate is 30 frames/second, the delay detector 54 calculates the ideal frame count based on the reference time according to the formula (3):

$$\text{ideal frame count} = \text{reference time} \times \text{frame rate} = \text{reference time} \times 30.$$

Next, the delay detector 54 compares the actual frame count obtained by the video frame counter 52 with the ideal frame count. The progress of the video portion with respect to the audio portion is calculated according to the formula (4):

$$\text{progress of video portion} = \text{actual frame count} - \text{ideal frame count}.$$

The determination of progress of the video portion will be explained by substituting numerical values for the ideal frame count and the actual frame count.

When the ideal frame count is 10 and the actual frame count is 11, the progress of the video portion is determined as 1 and it is determined that the video portion is faster than the audio portion. In this case, the video process is not performed.

When the ideal frame count is 10 and the actual frame count is 11, the progress of the video portion is determined as 0 and it is determined that synchronization has been achieved. The process proceeds to step C5, where the expansion and display processes for the video data are carried out.

When the ideal frame count is 10 and the actual frame count is 5, the progress of the video portion is determined as −5, and it is determined that the video portion is delayed with respect to the audio portion. The delay is recovered by degrading the tone quality in the audio process and skipping audio portion so as to save time for the process for the audio data, and by assigning the saved time to the process for the video data. In the video process, when the flag of the instruction to drop the video frame is set in step B15, the delay in the video portion is recovered by dropping the video frames.

The degrading of the tone quality will be explained. In the invention, the degrading is achieved by playing back multichannel data through a single channel. To convert two channels of data, which are a right channel and a left channel, into one channel of data, average values of data in the right and left channels are used. The data obtained through a single channel are half the data size of the original data through two channels.

Further, in the invention, the degrading of the tone quality is achieved by reducing the sampling frequency. For example, when the data with the sampling frequency of 44,100 Hz are converted into data with a sampling frequency of 22,050 Hz, the conversion is achieved by executing a thinning process in every one sample. The data obtained at 22,050 Hz are half the data size of the original data at 44,100 Hz.

The above described two methods may be combined to reduce the data size to ¼. The time required for data transmission between modules and devices can be reduced to ¼, compared with the former state, and the saved time can be assigned to the process for the video data.

The audio skipped process will be explained. A playback time for one AAU in the MPEG data is calculated according to the formula (5):

time for one AAU=the number of sample×bit rate/(sampling frequency×bit rate)×1000=384×192000/(44100×192000)×1000= 8.707 millisecond The invention utilizes the auditory characteristic that people cannot sense a skip of one AAU in the invention by hearing because the time for one AAU is extremely short. However, when too many audio skipped processes are carried out in a predetermined time, the sound may become slow and flat. To avoid this, the maximum number of executable skips in a predetermined time is preset, and when the number of skips reaches the maximum, the flag of the instruction to drop video frames is set.

As described above, the audio skipped process saves the time for expansion of the audio data, and the saved time can be allocated to the process for the video process.

While the preferred embodiment of this invention has been described above, obviously modifications and variations are possible within the scope of this invention. For example, while the embodiment uses the reduction of the number of the channels and of the sampling frequency as the method for degrading the tone quality, other methods for reducing an output data size may be employed. While the embodiment uses the average values in the method for reducing the number of the channels, other reduction methods may be employed. Further, while the embodiment uses the thinning process in the method for reducing the sampling frequency, other reduction methods may be employed.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. An audio-video synchronous playback apparatus for expanding digital compressed audio data and digital compressed video data, respectively, and for synchronously playing back expanded audio data and expanded video data, comprising:

a means for obtaining an audio playback time based on the amount of said played-back audio data;

a means for determining progress in expanding said video data based on said audio playback time; and a recovery means for saving the processing time for said audio data and assigning a saved time to a process for said video data so as to recover any delay in a video portion when the expansion process for said video data is delayed with respect to the expansion process for said audio data.

2. An audio-video synchronous playback apparatus according to claim 1, wherein said recovery means comprises a means for degrading the tone quality of an audio portion so as to save said processing time for said audio data.

3. An audio-video synchronous playback apparatus according to claim 2, wherein said recovery means degrades the tone quality by reducing the number of audio channels.

4. An audio-video synchronous playback apparatus according to claim 2, wherein said recovery means degrades the tone quality by reducing the sampling frequency.

5. An audio-video synchronous playback apparatus according to claim 2, wherein said recovery means degrades the tone quality by reducing the number of audio channels and by reducing the sampling frequency.

6. An audio-video synchronous playback apparatus according to claim 1, wherein said recovery means comprises a means for skipping said audio data so as to save said processing time for said audio data.

7. An audio-video synchronous playback apparatus according to claim 6, wherein said recovery means comprises a means for monitoring and limiting the number of the skips in a predetermined time when said audio data are skipped.

8. An audio-video synchronous playback apparatus according to claim 1, wherein said recovery means comprises:

a tone degrading means for degrading the tone quality of an audio portion so as to save said processing time for said audio data;

a audio skipping means for skipping said audio data so as to save said processing time for said audio data; and a video dropping means for dropping a video frame to recover any delay in the video portion when the delay is not recovered by said tone degrading means and said audio skipping means.

9. An audio-video synchronous playback apparatus according to claim 1, wherein the progress in expanding said video data is determined by calculating an ideal frame count of video frames to be naturally expanded and displayed, and by comparing an actual frame count of video frames which has been actually expanded and displayed, with said ideal frame count.

10. An audio-video synchronous playback method for expanding digital compressed audio data and digital compressed video data, respectively, and for synchronously playing back expanded audio data and expanded video data, comprising the steps of:

obtaining an audio playback time based on the amount of said played-back audio data;

determining progress in expanding said video data based on said audio playback time; and saving the processing time for said audio data and assigning a saved time to a process for said video data so as to recover any delay in a video portion when the expansion process for said video data is delayed with respect to the expansion process for said audio data.

11. An audio-video synchronous playback method according to claim 10, wherein the step of recovering any delay in a video portion includes degrading the tone quality of an audio portion so as to save said processing time for said audio data.

12. An audio-video synchronous playback method according to claim 11, wherein the tone quality of the audio portion is degraded by reducing the number of audio channels.

13. An audio-video synchronous playback method according to claim 11, wherein the tone quality of an audio portion is degraded by reducing the sampling frequency.

14. An audio-video synchronous playback method according to claim 11, wherein the tone quality of an audio portion is degraded by reducing the number of channels of the audio portion and by reducing the sampling frequency.

15. An audio-video synchronous playback method according to claim 10, wherein the step of recovering any delay in a video portion includes skipping said audio data so as to save said processing time for said audio data.

16. An audio-video synchronous playback method according to claim 15, wherein the step of recovering delay in a video portion includes monitoring and limiting the number of the skips in a predetermined time when said audio data are skipped.

17. An audio-video synchronous playback method according to claim 10, wherein the step of recovering any delay in a video portion includes the steps of:

degrading the tone quality of an audio portion so as to save said processing time for said audio data;

skipping said audio data so as to save said processing time for said audio data; and dropping a video frame to recover any delay in the video portion when the delay is not recovered by said first and second means.

18. An audio-video synchronous playback method according to claim 10, wherein the progress in expanding said video data is determined by calculating an ideal frame count of video frames to be naturally expanded and displayed, and by comparing an actual frame count of video frames which has been actually expanded and displayed, with said ideal frame count.

* * * * *